US009477457B1

(12) United States Patent
Langton et al.

(10) Patent No.: US 9,477,457 B1
(45) Date of Patent: Oct. 25, 2016

(54) AUTOMATED SOFTWARE INSTALLATION USING A CLICK AREA PREDICTION MODEL

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 256 days.

(21) Appl. No.: 14/230,122

(22) Filed: Mar. 31, 2014

(51) Int. Cl.
| G06F 9/445 | (2006.01) |
| G06N 5/04 | (2006.01) |
| G06N 99/00 | (2010.01) |

(52) U.S. Cl.
CPC ............ *G06F 8/61* (2013.01); *G06N 5/048* (2013.01); *G06N 99/005* (2013.01)

(58) Field of Classification Search
None
See application file for complete search history.

(56) References Cited

U.S. PATENT DOCUMENTS 8,863,113 B1 * 10/2014 Koryakina ............... G06F 8/61
717/115

OTHER PUBLICATIONS

Tom Yeh, Tsung-Hsiang Chang, Robert C. Miller, "Sikuli: Using GUI Screenshots for Search and Automation", Proceeding UIST '09 Proceedings of the 22nd annual ACM symposium on User interface software and technology, Oct. 4, 2009, pp. 183-192.*
James Eagan, Michel Beaudouin-Lafon, Wendy E. Mackay, "Cracking the Cocoa Nut: User Interface Programming at Runtime", Proceeding UIST '11 Proceedings of the 24th annual ACM symposium on User interface software and technology, Oct. 16, 2011, pp. 225-234.*
Xun Yuan, Myra B. Cohen and Atif M. Memon, "GUI Interaction Testing: Incorporating Event Context", IEEE Transactions on Software Engineering ,vol. 37 ,No. 4, Jul./Aug. 2011, pp. 1-16.*
Paul Givens, Aleksandar Chakarov, Sriram Sankaranarayanan, Tom Yeh, "Exploring the Internal State of User Interfaces by Combining Computer Vision Techniques with Grammatical Inference", Proceeding ICSE '13 Proceedings of the 2013 International Conference on Software Engineering, May 18, 2013, pp. 1165-1168.*

* cited by examiner

*Primary Examiner* — Kakali Chaki
*Assistant Examiner* — Walter Hanchak
(74) *Attorney, Agent, or Firm* — Harrity & Harrity, LLP

(57) ABSTRACT

A device may receive an instruction to automatically install a program using a click area prediction model. The click area prediction model may be associated with predicting a click area of a user interface that, when selected, causes a program installation procedure to proceed. The device may identify an installation user interface associated with installing the program. The device may determine a group of regions included in the installation user interface. The device may identify sets of features associated with the group of regions. The device may determine, based on the sets of features and the click area prediction model, a group of scores associated with the group of regions. The device may identify a particular region as a predicted click area based on the group of scores. The device may select the predicted click area to attempt to cause the program installation procedure to proceed.

20 Claims, 14 Drawing Sheets

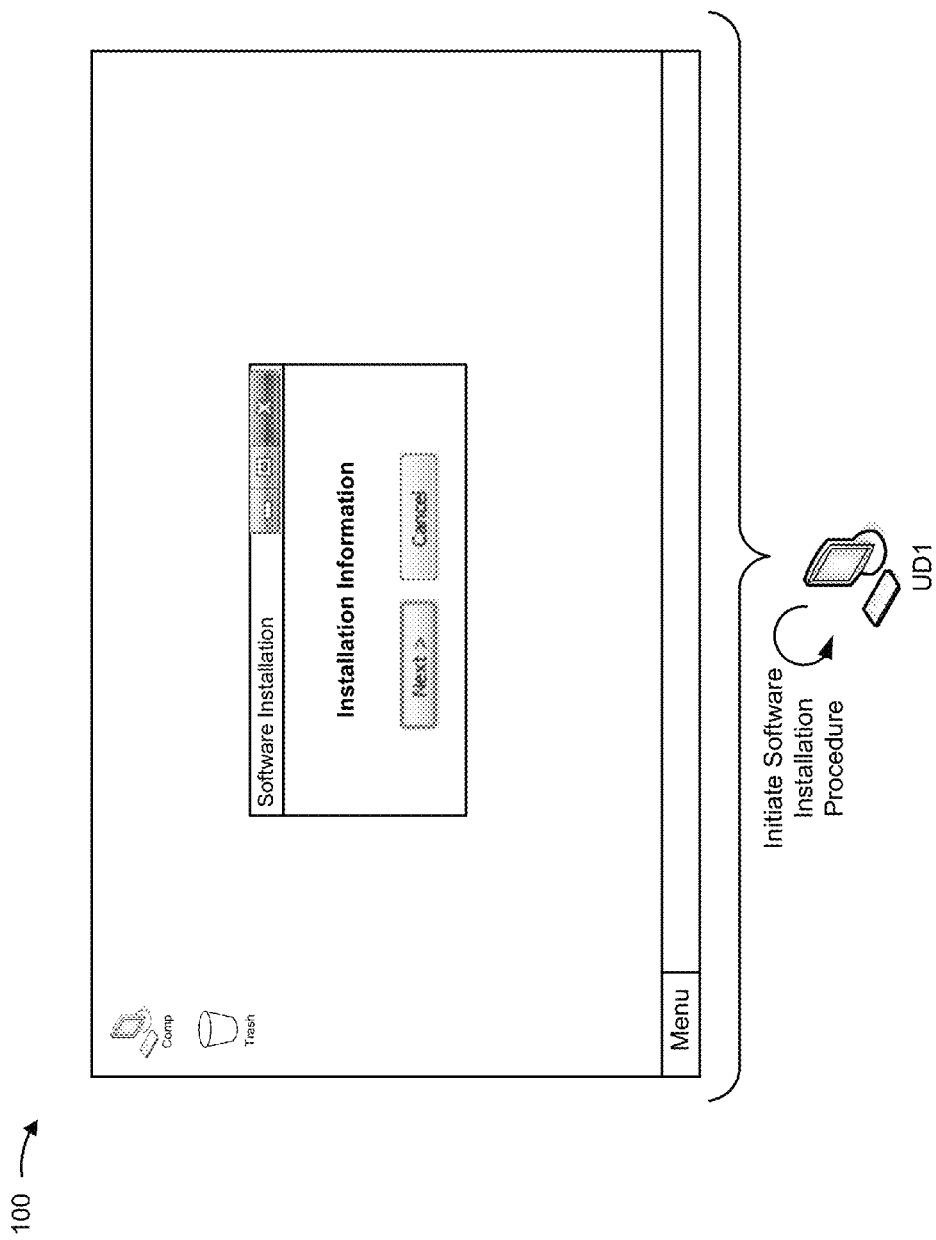

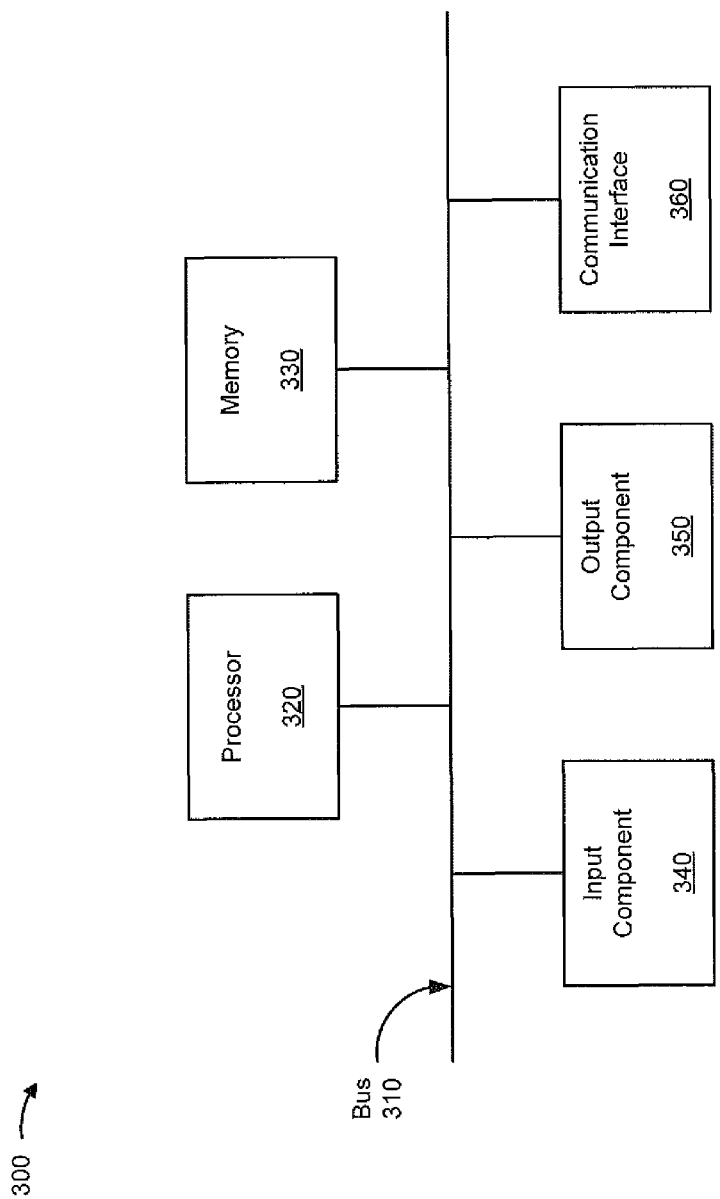

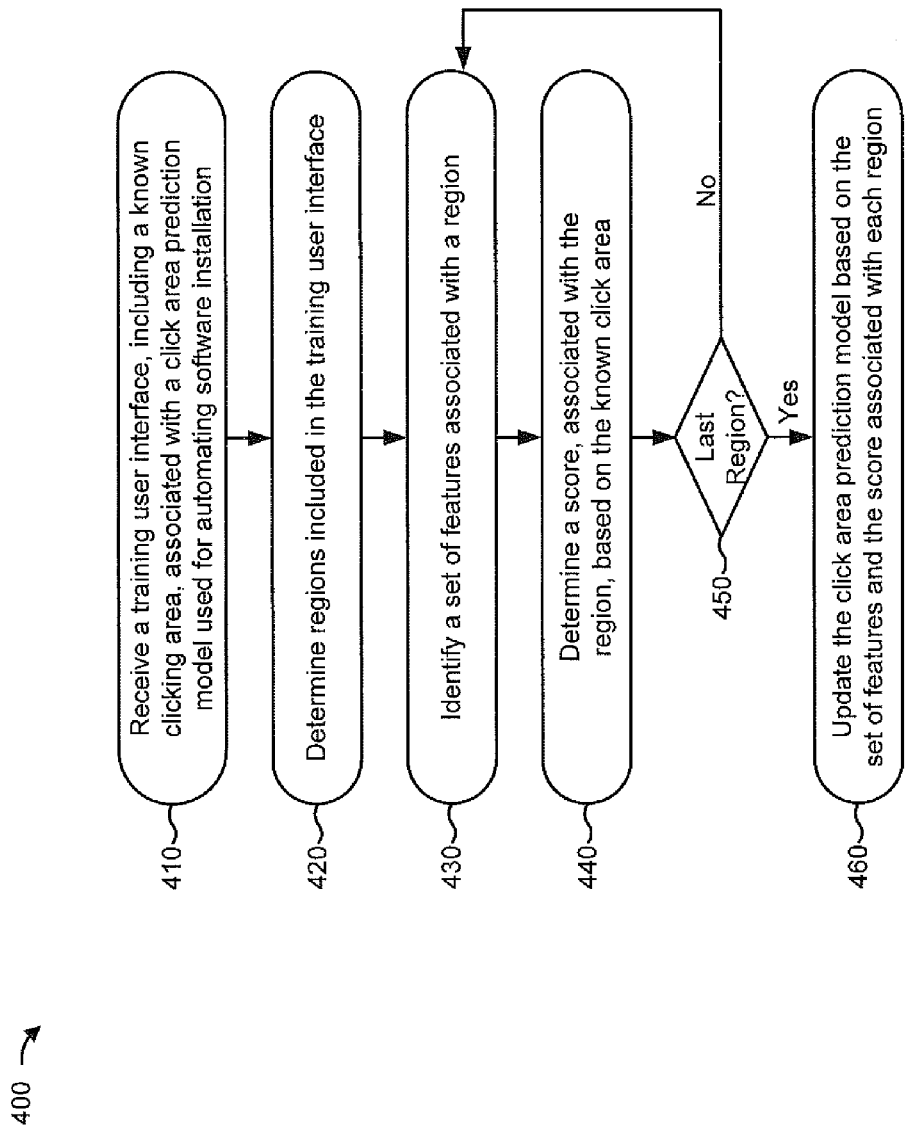

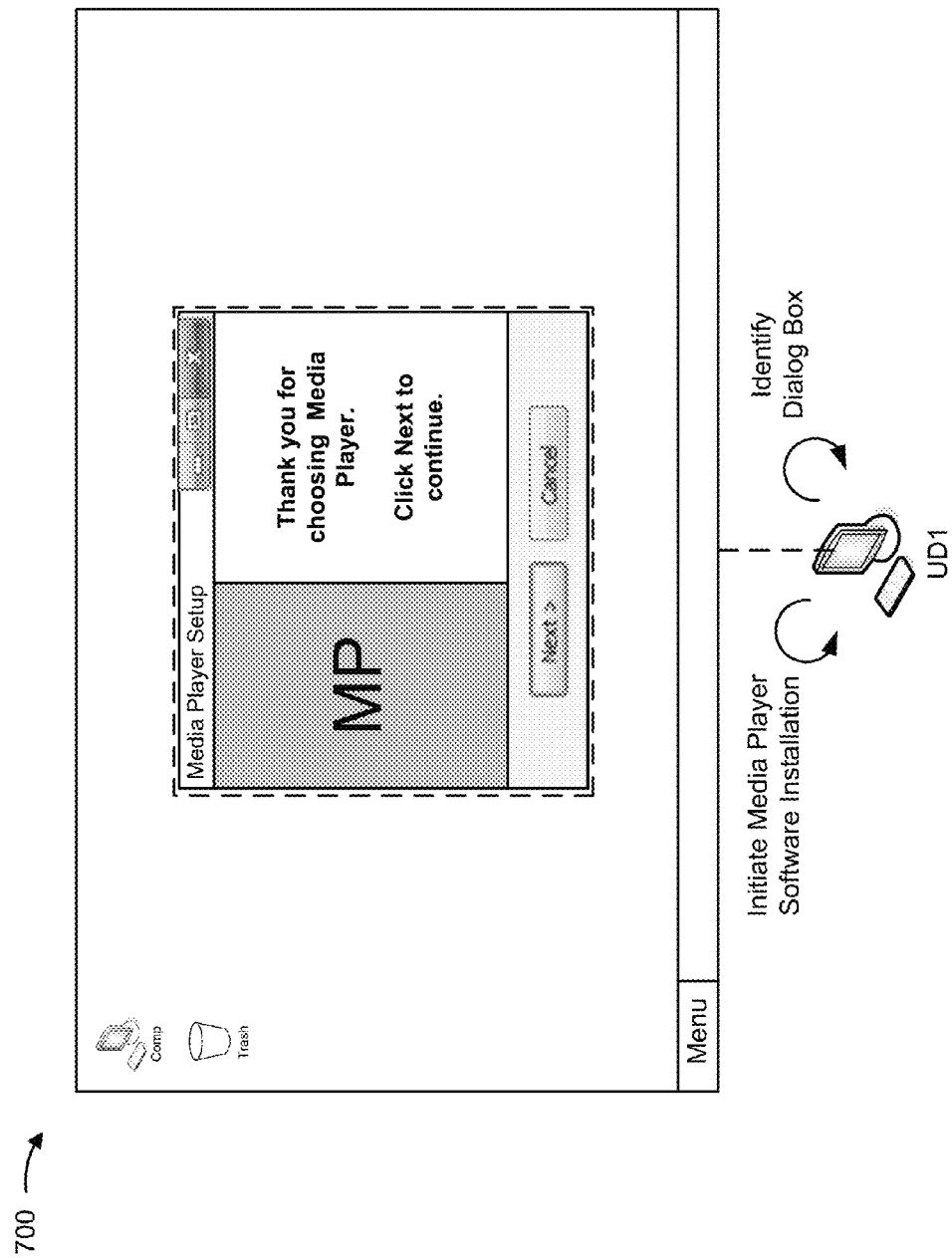

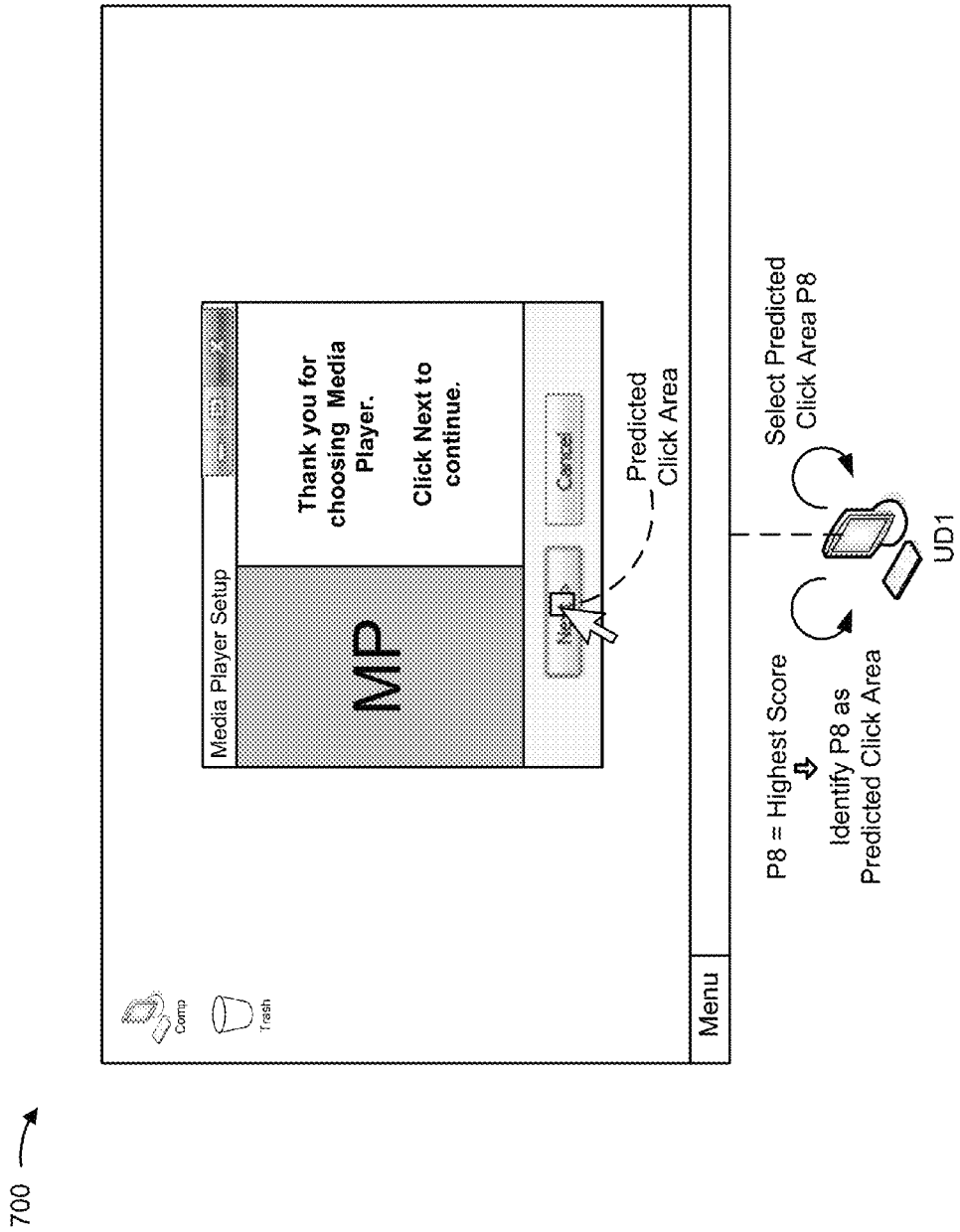

AUTOMATED SOFTWARE INSTALLATION USING A CLICK AREA PREDICTION MODEL

BACKGROUND

A computer program (e.g., software) may be installed on a device to allow the program to be executed by the device. Some programs are supplied in a form unsuitable for immediate execution and require an installation procedure. The program may be repeatedly executed after installation (e.g., without the need to reinstall the program before each execution).

SUMMARY

According to some possible implementations, a device may include one or more processors to: receive an instruction to automatically install a program using a click area prediction model, where the click area prediction model may be associated with predicting a click area of a user interface, and where the click area may include an area of a user interface that, when selected, causes a program installation procedure, associated with installing the program, to proceed; identify an installation user interface associated with installing the program; determine a group of regions included in the installation user interface; identify sets of features associated with the group of regions, where each set of features, of the sets of features, may correspond to a region of the group of regions; determine, based on the sets of features and the click area prediction model, a group of scores associated with the group of regions, where each score, of the group of scores, may correspond to a region of the group of regions; identify a particular region, of the group of regions, as a predicted click area based on the group of scores; and select the predicted click area, where the predicted click area may be selected to attempt to cause the program installation procedure to proceed.

According to some possible implementations, a computer-readable medium may store one or more instructions that, when executed by one or more processors, cause the one or more processors to: receive an indication to install a program, without user intervention, using a click area prediction model associated with predicting a click area of a user interface, where the click area may include an area of a user interface that, when selected, causes a program installation process, associated with installing the program, to continue; determine an installation user interface associated with installing the program; identify a group of regions included in the installation user interface; determine sets of features associated with the group of regions, where each set of features, of the sets of features, may be associated with a corresponding region of the group of regions; determine, based on the sets of features and the click area prediction model, a group of scores associated with the group of regions, where each score, of the group of scores, may be associated with a corresponding region of the group of regions, and where each score, of the group of scores, may reflect a prediction that the corresponding region is associated with a click area of the installation user interface; identify a particular region, of the group of regions, as a predicted click area based on the group of scores; and select the predicted click area, where the predicted click area may be selected to attempt to cause the program installation process to continue.

According to some possible implementations, a method may include: receiving, by a device, an indication to automatically install software using a click area prediction model, where the click area prediction model may be associated with predicting a click area of a user interface, and where the click area including an area of a user interface that, when selected, causes a software installation procedure, associated with installing the software, to advance; identifying, by the device, an installation user interface associated with installing the program; determining, by the device, a group of regions include in the installation user interface; identifying, by the device, sets of features associated with the group of regions, where each set of features of the sets of features may correspond to a region of the group of regions; determining, by the device, a group of scores associated with the group of regions, where the group of scores may be determined based on inputting the sets of features into the click area prediction model, and where each score of the group of scores may correspond to a region of the group of regions; identifying, by the device, a predicted click area based on the group of scores; and selecting, by the device, the predicted click area based on identifying the predicted click area, where the predicted click area may be selected to attempt to cause the software installation procedure to advance.

BRIEF DESCRIPTION OF THE DRAWINGS

FIGS. 1A-1C are diagrams of an overview of an example implementation described herein;

FIG. 3 is a diagram of example components of one or more devices of FIG. 2;

FIG. 4 is a flow chart of an example process for training a click area prediction model associated with an automated software installation;

FIGS. 7A-7E are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A user may wish to install software (e.g., a computer program, an application, etc.) on a user device (e.g., a laptop computer, a desktop computer, a tablet, etc.). In some cases, the user may want the user device to install the software automatically (e.g., without user intervention) by automatically navigating a series of user interfaces (e.g., dialog boxes) associated with installing the software. However, this type of automated software installation may require the user device to be capable of intelligently interacting with the dialog boxes. In some cases, the use of standard dialog boxes in a software installation procedure may allow the software installation to be scripted (e.g., using an operating system specific application programming interface), but this approach fails when a software installation procedure uses non-standard dialog boxes. Implementations described herein may allow a device to automatically (e.g., without user intervention) install software by training a click area prediction model to detect and intelligently select click areas of user interfaces (e.g., dialog boxes) associated with installing the software. In this way, software may be automatically installed, despite the use of non-standard user interfaces in the software installation procedure.

Figure 1B:
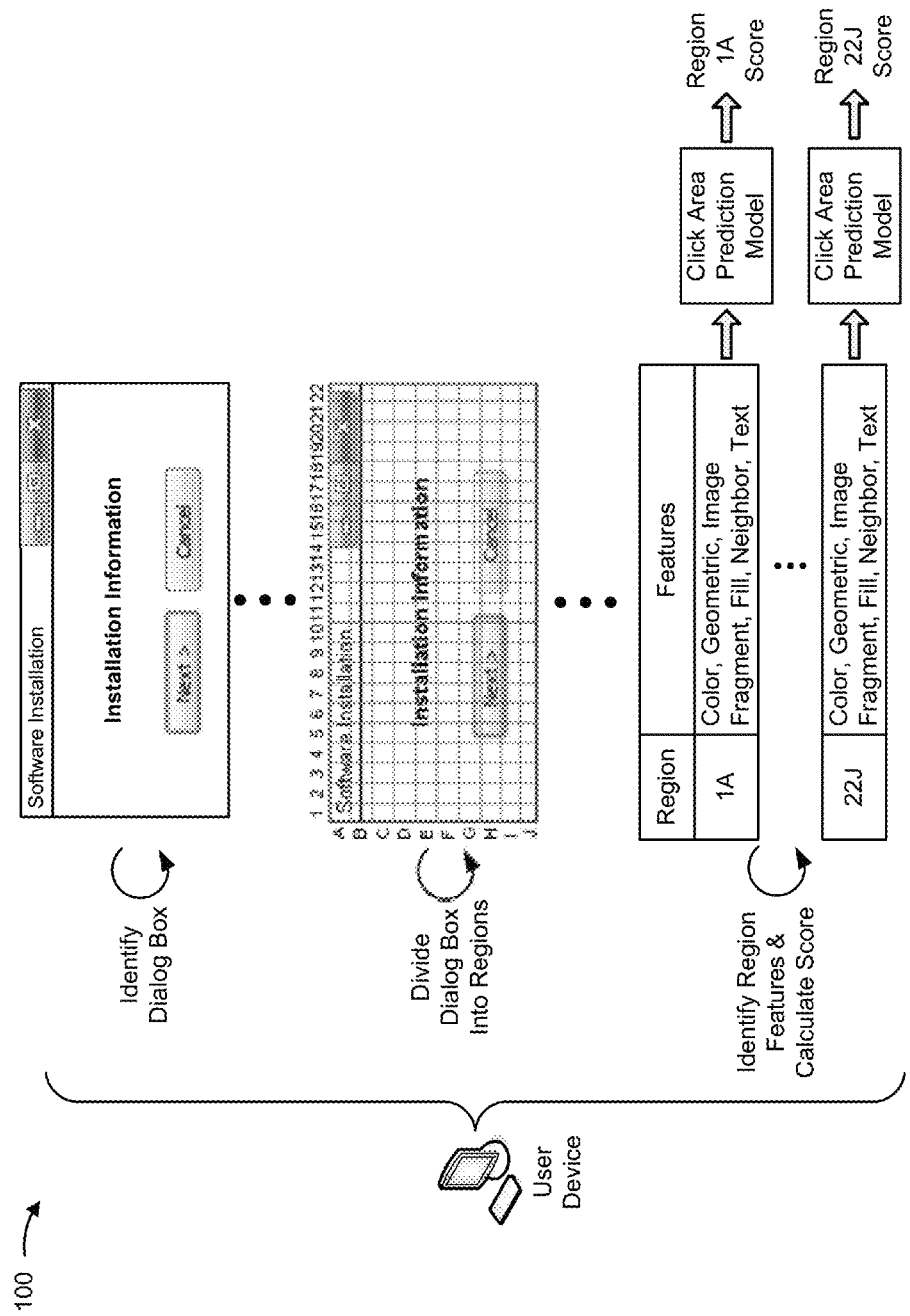
Figure 1C:
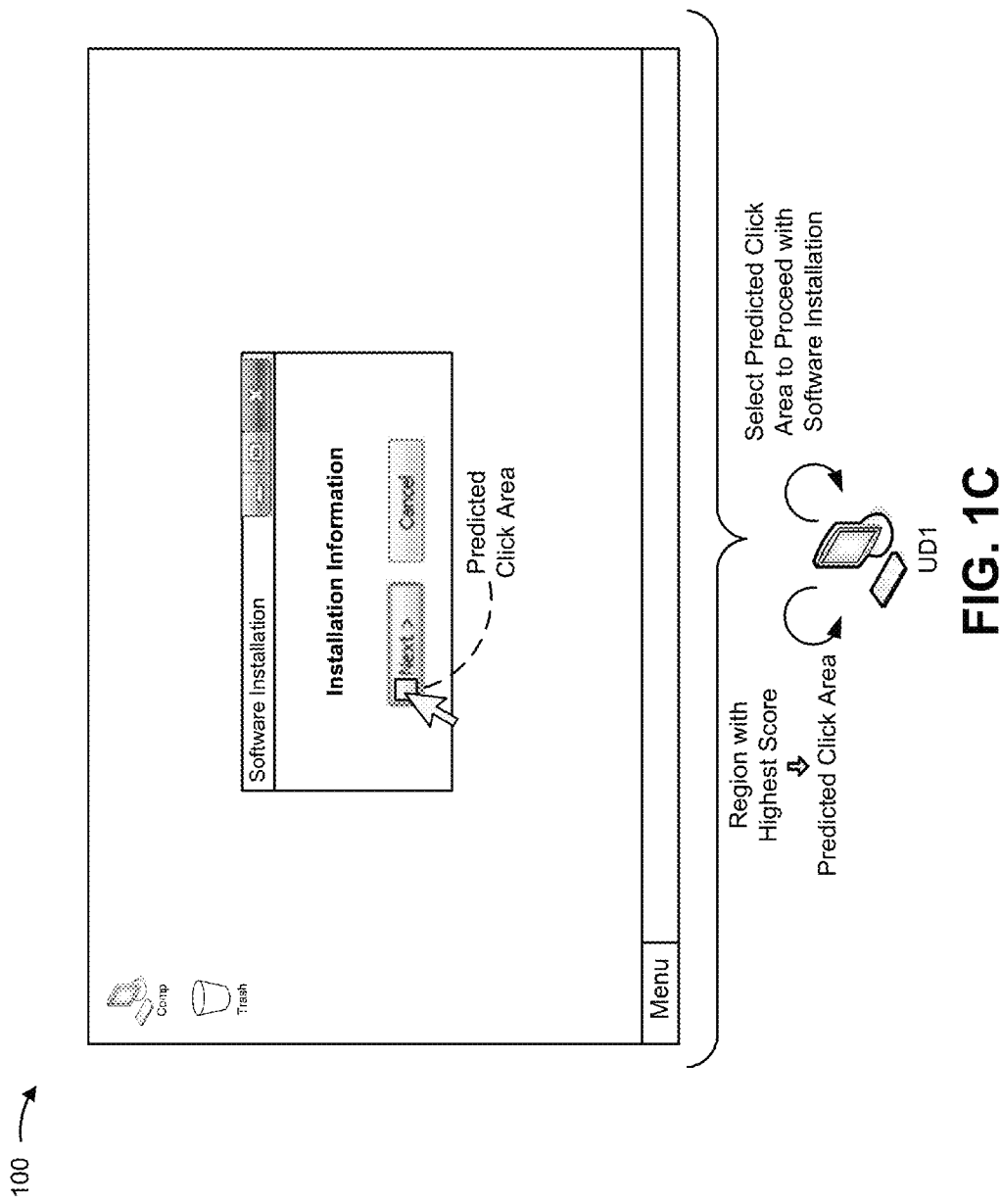

FIGS. 1A-1C are diagrams of an overview of an example implementation 100 described herein. For the purposes of example implementation 100, assume that a user device has received an instruction to automatically (e.g., without user intervention), install software (e.g., a computer program). Further, assume that the user device stores a click area prediction model that may be used to predict one or more click areas of dialog boxes associated with installing the software (e.g., areas, included in the dialog boxes, that, when selected, may advance the software installation, such as a "Next" button, etc.).

As shown in FIG. 1A, the user device may receive the instruction to automatically install the software, and may initiate a software installation procedure associated with installing the software. As shown, the software installation procedure may begin by causing the user device to display a software installation dialog box.

As shown in FIG. 1B, the user device may identify a dialog box associated with the software installation (e.g., after the user device initiates the software installation procedure). As further shown, the user device may determine a group of regions, associated with the dialog box, by dividing (e.g., using a grid system) the dialog box into regions.

As further shown in FIG. 1B, the user device may identify a set of features associated with a first region (e.g., region 1A), such as color features of the region, geometric features of the region, image fragment features of the region, fill features of the region, neighbor features of the region, and/or text features of the region. As shown, the user device may input the set of features, associated with the first region, into the click area prediction model (e.g., stored and/or accessible by the user device), and the click area prediction model may output a score associated with the first region. The score (e.g., a numerical value) may indicate the likelihood that the first region is within a desired click area of the dialog box. As shown, the user device may continue to identify sets of features, associated with each region, and input the sets of features into the click area prediction model to generate a score for each region of the dialog box.

As shown in FIG. 1C, the user device may determine the scores, and may identify the region that corresponds to the highest score as a predicted click area. For the purposes of example implementation 100, assume that the predicted click area is a region that falls within the Next button included in the dialog box. As shown, the user device may select the predicted click area to attempt to proceed with the software installation without user intervention. The user device may continue in this manner by predicting a click area for another dialog box associated with installing the software (e.g., a dialog box that appears after selecting the Next button in the first dialog box). In this way, a user device may automatically (e.g., without user intervention) install software using a click area prediction model to detect and intelligently click on user interfaces (e.g., dialog boxes) associated with installing the software.

Figure 2:
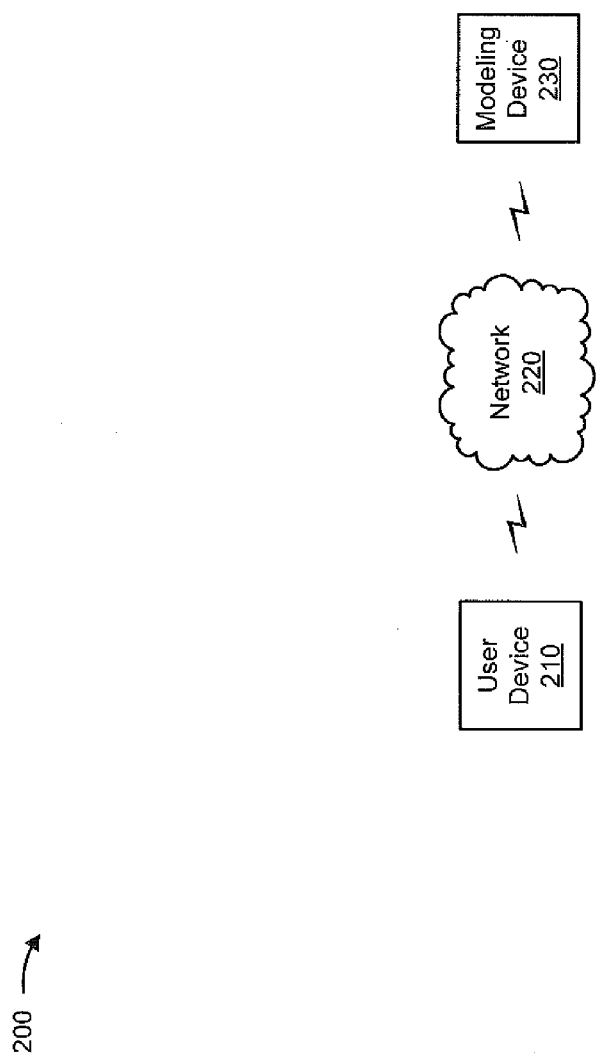
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, and a modeling device 230.

User device 210 may include one or more devices capable of automatically installing software based on an output of a click area prediction model. For example, user device 210 may include a computing device, such as a laptop computer, a tablet computer, a handheld computer, a desktop computer, a mobile phone (e.g., a smart phone, a radiotelephone, etc.), a personal digital assistant, a gaming device, or a similar device. In some implementations, user device 210 may be capable of identifying a user interface (e.g., a dialog box) associated with a software installation, determining a group of regions associated with the user interface, and identifying (e.g., using computer vision, by analyzing the user interface, etc.) a set of features associated with each region of the group of regions. Additionally, or alternatively, user device 210 may be capable of inputting the set of features, associated with the region, into a click area prediction model, and receiving an output (e.g., a score) provided by the click area prediction model.

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as user device 210 and modeling device 230.

Modeling device 230 may include one or more devices capable of receiving, providing, generating, storing, and/or processing information associated with a click area prediction model. For example, modeling device 230 may include a computing device, such as a server. In some implementations, modeling device 230 may be capable of storing and/or providing information associated with the click area prediction model. Additionally, or alternatively, modeling device 230 may be capable of analyzing a training user interface and updating and/or training the click area prediction model based on a result of analyzing the training user interface.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. For example, user device 210 and modeling device 230 may be implemented within a single device. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 is a diagram of example components of a device 300. Device 300 may correspond to user device 210 and/or modeling device 230. Additionally, or alternatively, each of user device 210 and/or modeling device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flow chart of an example process 400 for training a click area prediction model associated with an automated software installation. In some implementations, one or more process blocks of FIG. 4 may be performed by modeling device 230. In some implementations, one or more process blocks of FIG. 4 may be performed by another device or a group of devices separate from or including modeling device 230, such as user device 210.

As shown in FIG. 4, process 400 may include receiving a training user interface, including a known click area, associated with a click area prediction model used for automating software installation (block 410). For example, modeling device 230 may receive a training dialog box, including a known click area, associated with a click area prediction model used for automating software installation. In some implementations, modeling device 230 may receive the training user interface from another device (e.g., a device associated with generating the training user interface). In some implementations, modeling device 230 may receive the training user interface based on user input (e.g., when a user of modeling device 230 creates the training user interface).

A training user interface may include a user interface that includes a known click area. A known click area may include an area of a training user interface, known to modeling device 230, that, when selected (e.g., by clicking), would cause a software installation to proceed (e.g., if the training user interface were a part of an actual software installation). For example, a training user interface may include an area (e.g., a rectangle, a square, etc.), corresponding to a "Next" button, and "Install" button, an "OK" button, or the like, that is identified as a click area. In this example, modeling device 230 may receive information that identifies the known click area when modeling device 230 receives the training user interface.

A click area prediction model may include a model designed to predict a click area of a user interface associated with an automated software installation (e.g., when the click area of the user interface is unknown). In some implementations, the click area prediction model may include a machine-learning model, such as a support vector machine. Additionally, or alternatively, the click area prediction model may include another type of model. In some implementations, modeling device 230 may store information associated with the click area prediction model. Additionally, or alternatively, modeling device 230 may provide information associated with the click area prediction model to another device (e.g., user device 210) such that the click area prediction model may be used to predict a click area of an unknown user interface.

In some implementations, modeling device 230 may create, train, and/or update the click area prediction model based on features associated with a training user interface, as discussed below.

As further shown in FIG. 4, process 400 may include determining regions included in the training user interface (block 420). For example, modeling device 230 may determine regions included in the training user interface. In some implementations, modeling device 230 may determine the regions when modeling device 230 receives the training user interface (e.g., after modeling device 230 receives the training user interface).

Regions of a user interface (e.g., a training user interface) may include two or more portions of a user interface that, when combined, comprise the entire user interface. For example, modeling device 230 may determine the regions of the training user interface by dividing the training user interface into a group of regions (e.g., using a grid system). As another example, user device 210 may determine the regions of a user interface, associated with installing software, by dividing the user interface into a group of regions, as discussed below with regard to step 630. In some implementations, the regions may be of equal size (e.g., each region includes one pixel, each region includes one hundred pixels, etc.). Alternatively, the regions may be of unequal size.

In some implementations, the regions may be determined based on elements of the user interface. For example, modeling device 230 may detect an area of the user interface that may be indicative of an edge of a rectangle, and modeling device 230 may determine the regions based on detecting the edge of the rectangle (e.g., such that the edge of the rectangle corresponds to an edge of one or more regions). In some implementations, the size, shape, and/or manner in which the regions are to be determined may be based on input, provided to modeling device 230, by a user of modeling device 230.

As further shown in FIG. 4, process 400 may include identifying a set of features associated with a region (block 430). For example, modeling device 230 may identify a set of features associated with a region. In some implementations, modeling device 230 may identify the set of features associated with a region when modeling device 230 determines the regions included in the training user interface (e.g., after modeling device 230 determines the regions).

In some implementations, modeling device 230 may identify the features associated with the region based on analyzing the region. For example, modeling device 230 may analyze the region (e.g., using computer vision, using an optical character recognition (OCR) tool, etc.), and may identify the features based on a result associated with analyzing the region.

Features, associated with a region of a user interface (e.g., a training user interface, a user interface associated with installing software, etc.), may include characteristics of the region that may be indicative of whether the region is located in a click area. For example, the features associated with the region may include color features, geometric features, image fragment features, fill features, text features, neighbor features, and/or one or more other types of features.

A color feature may include a feature associated with one or more colors included in a region of a user interface. For example, the color feature may include a color name, an average color by component (e.g., a red component, a green component, a blue component), a color brightness, a color luminance, a quantity of different colors in the region, etc. of one or more colors included in the region. As another example, the color feature may include information indicating a difference between the color of the region and a background color of the user interface, information indicating a difference between the color of the region and an average color of the user interface, etc.

A geometric feature may include a feature associated with a position of the region. For example, the geometric feature of a region may include information indicating a position of the region (e.g., within the user interface), a shape and a size of the region as compared to a shape and a size of the user interface, etc. As another example, the geometric feature may include information indicating a proximity of the region to a geometric object (e.g., a rectangle, an edge, etc.) included in the user interface.

An image fragment feature may include a feature indicating whether the region matches another region, associated with a click area, known to modeling device 230. For example, modeling device 230 may store information (e.g., an image fragment) that includes a region that has been identified as being included in a click area, and modeling device 230 may determine whether the region matches the image fragment. In this example, the image fragment feature may indicate that the region matches the image fragment that has been identified as being included in the click area.

A fill feature may include a feature associated with a distance between lines and/or transitions included in the region. For example, modeling device 230 may identify the fill feature by analyzing the region from left to right (e.g., horizontally) to determine a distance between abrupt color changes included in the region (e.g., an abrupt color change may be indicative of a line, an edge, a geometric shape, etc. being included in the region).

A text feature may include a feature associated with text included in the region. For example, modeling device 230 may analyze the region using an OCR tool to determine whether the region includes text. In some implementations, modeling device 230 may analyze the region using the OCR tool, may detect text, and may determine a text feature based on the text included in the region. For example, modeling device 230 may identify a text feature including information indicating that the region includes a particular word (e.g., OK, Cancel, Next, Install, etc.), a particular letter, a particular symbol, etc.

Neighbor features may include one or more features of regions adjacent to the region. For example, the neighbor features of a first region may include color features of a second region, color features of a third region, etc. (e.g., when the second region is located immediately above the first region, when the third region is located immediately below the first region, etc.). In some implementations, the neighbor features may include color features, geometric features, image fragment features, fill features, text features, and/or another feature of one or more neighboring regions.

In some implementations, modeling device 230 may identify another type of feature (e.g., the listed features are not exhaustive of all possible features).

As further shown in FIG. 4, process 400 may include determining a score, associated with the region of the training user interface, based on the known click area (block 440). For example, modeling device 230 may determine a score, associated with the region, based on the known click area. In some implementations, modeling device 230 may determine the score, associated with the region, after modeling device 230 identifies the set of features associated with the region. Additionally, or alternatively, modeling device 230 may determine the score after modeling device 230 determines the regions included in the training user interface.

A score associated with a region of a user interface (e.g., a training user interface, a user interface associated with installing software, etc.) may include information (e.g., a numerical value) indicative of whether the region is located in a click area. In some implementations, the score may include a numerical value within a range (e.g., a range from 0 to 1, a range from 0 to 100, etc.).

In some implementations, the score may be determined based on information that identifies a known click area included in the training user interface. For example, modeling device 230 may receive the training user interface including the known click area, and may determine the regions included in the training user interface. In this example, modeling device 230 may determine a score, associated with each region of the training user interface, based on the known click area (e.g., a region at the center of the known click area may be associated with a score of 1.0, a region at the edge of the known click area may be associated with a score of 0.1, a region outside the known click area may be associated with a score of 0.0, etc.). In some implementations, user device 210 may determine that a region located at the center of the known click area is to receive a maximum score (e.g., 1.0), that a region located at the edge of the known click area is to receive a score between a minimum score and the maximum score (e.g., between 0.0 and 1.0), and that a region outside the known click area is to receive the minimum score (e.g., 0.0).

As further shown in FIG. 4, process 400 may include determining whether a set of features and a score have been determined for each region of the training user interface (block 450). For example, modeling device 230 may determine whether a set of features and a score have been determined for each region of the training user interface.

In some implementations, modeling device 230 may determine whether a set of features and a score have been determined for each region based on tracking information associated with modeling device 230. For example, modeling device 230 may determine the regions included in the training user interface, and modeling device 230 may maintain tracking information that identifies regions for which modeling device 230 has determined a set of features and a score, and modeling device 230 may determine whether a set of features and a score have been determined for each region based on the tracking information stored by modeling device 230.

As further shown in FIG. 4, if a set of features and a score have not been determined for each region of the training user interface (block 450—NO), then process 400 may return to block 430. For example, modeling device 230 may determine that a set of features and a score have not been determined for each region, and modeling device 230 may proceed with determining a set of features and a score for another region.

As further shown in FIG. 4, if a set of features and a score have been determined for each region of the training user interface (block 450—YES), then process 400 may include updating the click area prediction model based on the set of features and the score associated with each region (block 460). For example, modeling device 230 may determine a set of features and a score for each region of the training user interface, and modeling device 230 may update the click area prediction model based on the set of features and the score for each region of the training user interface.

In some implementations, modeling device 230 may update the click area prediction model based on information associated with the regions of the training user interface. For example, modeling device 230 may determine a first set of features, associated with a first region of the training user interface, that corresponds to a first score (e.g., 1.0), and may determine a second set of features, associated with a second region, that corresponds to a second score (e.g., 0.0). In this example, modeling device 230 may update the click area prediction model based on the first set of features (e.g., such that the click area prediction model is more likely to identify a click area when another region, associated with an unknown user interface, includes a region that includes a set of features similar to the first set of features). Similarly, modeling device 230 may update the click area prediction model based on the second set of features (e.g., such that the click area prediction model is less likely to identify a click area when another region, associated with an unknown user interface, includes a region that includes a set of features similar to the second set of features).

Additionally, or alternatively, modeling device 230 may update the click area prediction model based on information provided by user device 210. For example, user device 210 may successfully install software using the click area prediction model, and may provide, to modeling device 230, information associated with the successful software installation (e.g., sets of features associated with regions of a user interface, scores, determined by the click area prediction model, associated with the regions of the user interface, etc.), and modeling device 230 may update the click area prediction model based on the information, associated with the successful software installation, provided by user device 210.

In this way, modeling device 230 may receive a training user interface, including a known click area, may determine regions associated with the training user interface, and may determine a set of features and a score associated with each region of the training user interface. Modeling device 230 may modify, update, train, etc. a click area prediction model (e.g., a model designed to predict a click area of an unknown user interface), based on the sets of features and the scores associated with each region of the training user interface. Modeling device 230 may receive any number of training user interfaces in order to improve performance and/or accuracy of the click area prediction model.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
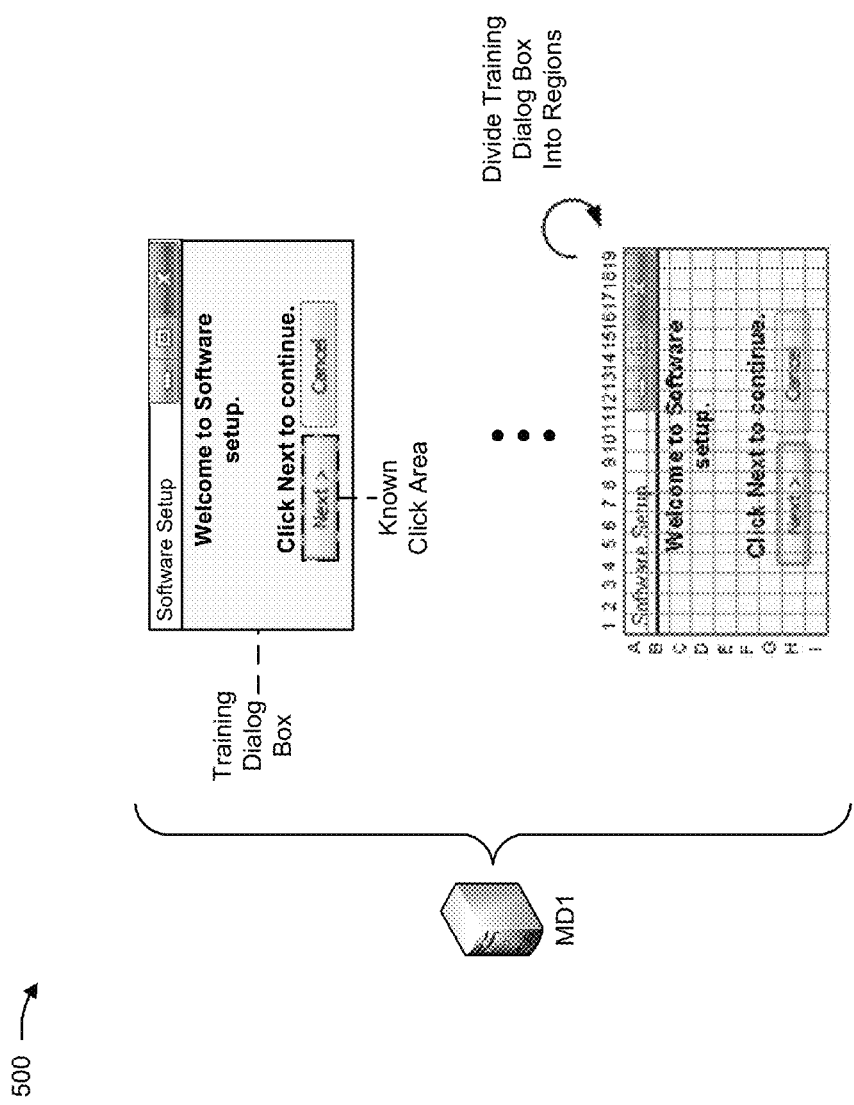
FIGS. 5A and 5B are diagrams of an example implementation relating to the example process shown in FIG. 4.
Figure 5B:
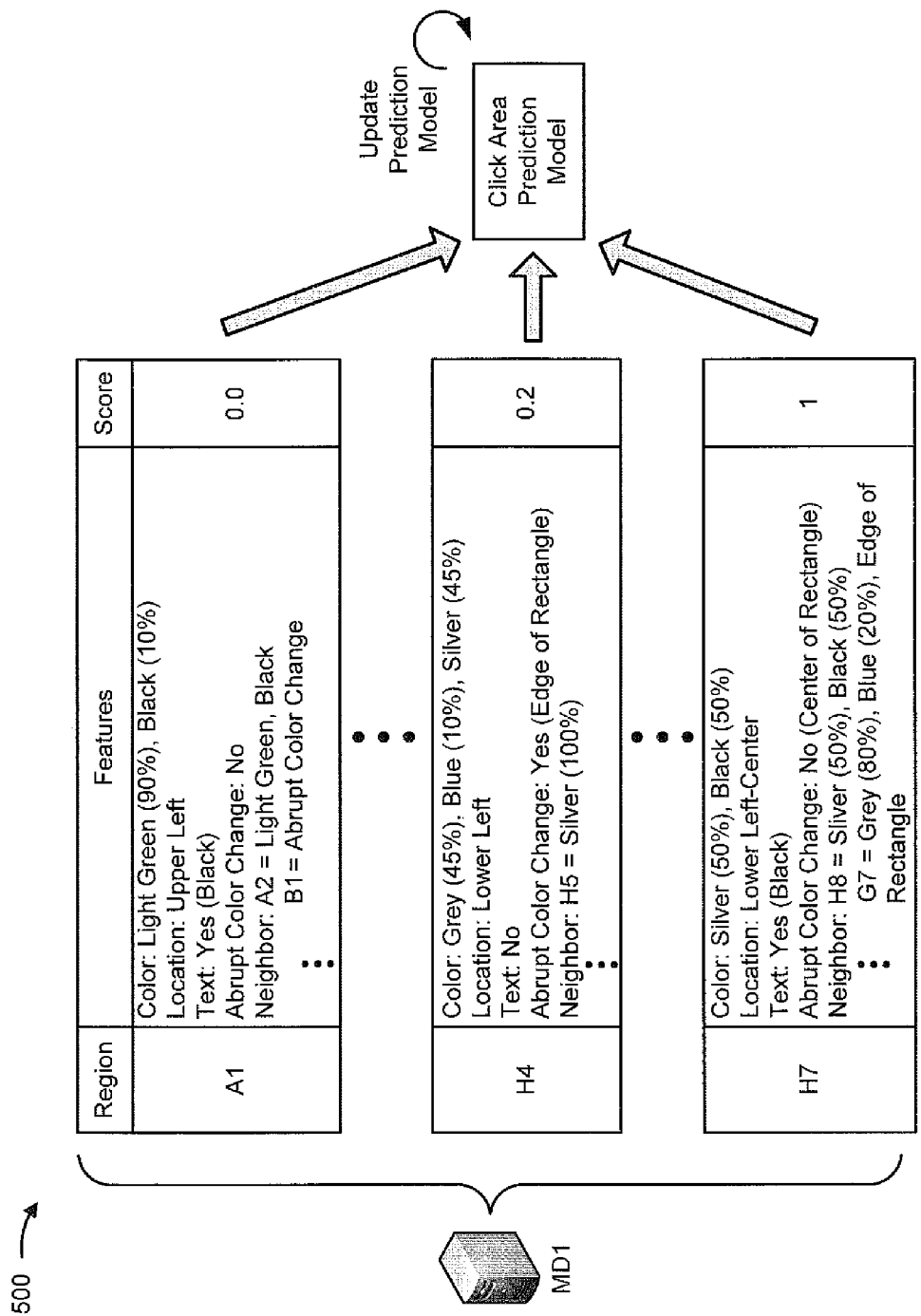

FIGS. 5A and 5B are diagrams of an example implementation 500 relating to example process 400 shown in FIG. 4. For the purposes of example implementation 500, assume that a modeling device, MD1, is configured to store, maintain, train, and update a click area prediction model associated with automating software installation. Further, assume that an administrator associated with MD1 has created (e.g., via a user device) a training user interface (e.g., a training dialog box) that includes information that identifies a known click area of the user interface.

As shown in FIG. 5A, MD1 may receive the training dialog box and the information that identifies the known click area (e.g., an area corresponding to a Next button included in the training dialog box). As further shown, MD1 may determine regions included in the training dialog box by dividing the training dialog box into regions using a grid system (e.g., including rows A through I and including columns 1 through 19).

As shown in FIG. 5B, MD1 may identify a set of features associated with a first region, A1. As shown, the set of features associated with the A1 region may include color features (e.g., Color: Light Green (90%), Black (10%)), geometric features (e.g., Location: Upper Left), text features (e.g., Text: Yes (Black)), fill features (e.g., Abrupt Color Change: No), neighbor features (e.g., Neighbor: A2=Light Green, Black, B1=Abrupt Color Change), and other features associated with the A1 region (not shown). As further shown, MD1 may also determine a score (e.g., Score: 0.0), associated with the A1 region (e.g., assume that MD1 is configured to determine a score of zero for any region not included in the known click area).

As further shown, MD1 may continue to determine a set of features and a score for each region of the training dialog box, including a set of features associated with region H4. As shown, the set of features associated with the H4 region may include color features (e.g., Color: Grey (45%), Blue (10%), Silver (45%)), geometric features (e.g., Location: Lower Left), text features (e.g., Text: No), fill features (e.g., Abrupt Color Change: Yes (Edge of Rectangle)), and neighbor features (e.g., Neighbor: H5=Silver (100%)), and other features associated with the H4 region (not shown). As further shown, MD1 may also determine a score (e.g., Score: 0.2), associated with the H4 region (e.g., assume that MD1 is configured to determine a score of 0.2 for any region on the edge the known click area).

As further shown, MD1 may continue to determine a set of features and a score for each region of the training dialog box, including a set of features associated with region H7. As shown, the set of features associated with the H7 region may include color features (e.g., Color: Silver (50%), Black (50%)), geometric features (e.g., Location: Lower Left-Center), text features (e.g., Text: Yes (Black)), fill features (e.g., Abrupt Color Change: No (Center of Rectangle)), and neighbor features (e.g., Neighbor: H8=Silver (50%), Black (50%), G7=Grey (80%), Blue (20%), Edge of Rectangle), and other features associated with the H7 region (not shown). As further shown, MD1 may also determine a score (e.g., Score: 1.0), associated with the H7 region (e.g., assume that MD1 is configured to determine a score of 1.0 for any region in the middle of the known click area).

As further shown in FIG. 5B, MD1 may provide information associated with the sets of features and the corresponding scores to the click area prediction model (e.g., stored by MD1). The click area prediction model may be modified, trained, and/or updated based on the information associated with the sets of features and the corresponding scores.

As indicated above, FIGS. 5A and 5B are provided merely as an example. Other examples are possible and may differ from what was described with regard to FIGS. 5A and 5B.

Figure 6:
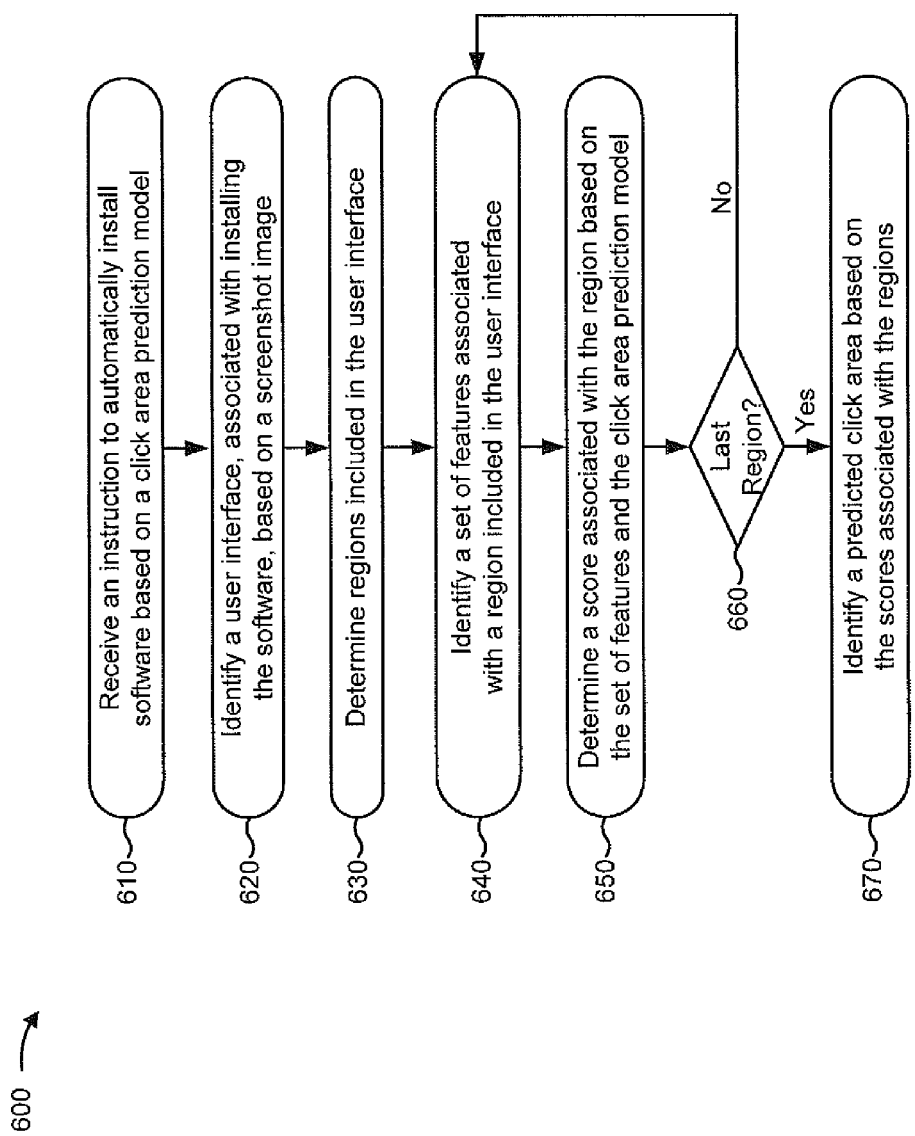
FIG. 6 is a flow chart of an example process for automating a software installation by determining and selecting a predicted click area of a user interface associated with installing the software.

FIG. 6 is a flow chart of an example process 600 for automating a software installation by determining and selecting a predicted click area of a user interface associated with installing the software. In some implementations, one or more process blocks of FIG. 6 may be performed by user device 210. In some implementations, one or more process blocks of FIG. 6 may be performed by another device or a group of devices separate from or including user device 210, such as modeling device 230.

As shown in FIG. 6, process 600 may include receiving an instruction to automatically install software based on a click area prediction model (block 610). For example, user device 210 may receive an instruction to automatically install software based on a click area prediction model.

In some implementations, user device 210 may receive the instruction to automatically install the software based on a configuration of user device 210. For example, user device 210 may be configured to automatically install software using a click area prediction model each time user device 210 receives information indicating that user device 210 is to install software. Additionally, or alternatively, a user of user device 210 may provide input instructing user device 210 to automatically install the software based on the click area prediction model (e.g., when the user initiates a software installation and then initiates an automated software installer that implements the click area prediction model). In some implementations, user device 210 may initiate a software installation procedure, associated with installing the software, when user device 210 receives the instruction (e.g., such that a first user interface, associated with the software installation, is displayed by user device 210).

As further shown in FIG. 6, process 600 may include identifying a user interface, associated with installing the software, based on a screenshot image (block 620). For example, user device 210 may identify a user interface, associated with installing the software, based on a screenshot image. In some implementations, user device 210 may identify the user interface when user device 210 receives the instruction to automatically install the software (e.g., after user device 210 receives the instruction and initiates the software installation procedure).

In some implementations, user device 210 may identify the user interface based on a screenshot image associated with user device 210. For example, user device 210 may capture a screenshot image reflecting information that is currently being displayed by a display screen of user device 210. In this example, user device 210 may capture the screenshot image after initiating the software installation procedure (e.g., after a first dialog box, associated with installing the software, has appeared), and may compare the screenshot image to a base screenshot image, stored by user device 210, that includes a standard background (e.g., a screenshot image captured while no user interfaces were being displayed by user device 210). User device 210 may then identify the user interface based on comparing the screenshot image and the base screenshot image.

In some implementations, user device 210 may identify the user interface using another method. For example, a graphics subsystem (e.g., associated with an operating system of user device 210) may be configured to capture the user interfaces (e.g., an image of the user interface) when the user interface is displayed by user device 210.

As further shown in FIG. 6, process 600 may include determining regions included in the user interface (block 630). For example, user device 210 may determine regions included in the user interface identified by user device 210. In some implementations, user device 210 may determine the regions when user device 210 identifies the user interface (e.g., after user device 210 identifies the user interface associated with installing the software).

In some implementations, user device 210 may determine regions included in the user interface in a manner to similar to that described above with regard to block 420. For example, user device 210 may determine the regions of the user interface based on a grid system, based on elements included in the user interface, or in another manner.

As further shown in FIG. 6, process 600 may include identifying a set of features associated with a region included in the user interface (block 640). For example, user device 210 may identify a set of features associated with a region included in the user interface. In some implementations, user device 210 may determine the set of features associated with the region after user device 210 determines the regions included in the user interface. Additionally, or alternatively, user device 210 may identify a set of features associated with a region after user device 210 identifies another set of features associated with another region and computes a score associated with the other region, as discussed below with regard to block 660.

In some implementations, user device 210 may identify the features associated with the region based on analyzing the region in a manner similar to that described above with regard to block 430. In some implementations, the features associated with the region of the user interface may include characteristics of the region that may be indicative of whether the region is located in a click area, such as color features, geometric features, image fragment features, fill features, text features, neighbor features, and/or one or more other types of features.

As further shown in FIG. 6, process 600 may include determining a score, associated with the region, based on the set of features and the click area prediction model (block 650). For example, user device 210 may determine a score, associated with the region, based on the set of features and the click area prediction model. In some implementations, user device 210 may determine the score when user device 210 identifies the set of features associated with the region (e.g., after user device 210 identifies the set of features).

A score associated with a region of a user interface may include information indicative of whether the region is located in a click area, as discussed above with regard to block 440. In some implementations, user device 210 may determine the score associated with the user interface based on inputting the set of features into the click area prediction model. For example, user device 210 may identify the set of features associated with the region, may provide information associated with the set of features as input to the click area prediction model (e.g., via modeling device 230), and the click area prediction model may provide, as output, a score associated with the region determined based on the set of features associated with the region.

As further shown in FIG. 6, process 600 may include determining whether a score has been determined for each of the regions (block 660). For example, user device 210 may determine whether a score has been determined for each region of the user interface associated with installing the software.

In some implementations, user device 210 may determine whether a score has been determined for each region based on tracking information associated with user device 210. For example, user device 210 may determine the regions included in the user interface associated with installing the software, and user device 210 may maintain tracking information that identifies regions for which user device 210 has determined a score, and user device 210 may determine whether a score has been determined for each region based on the tracking information stored by user device 210.

As further shown in FIG. 6, if a score has not been determined for each of the regions (block 660—NO), then process 600 may return to block 650. For example, user device 210 may determine that a score has not been determined for each region of the user interface associated with installing the software, and user device 210 may proceed with identifying a set of features (e.g., and subsequently determining a score) for another region included in the user interface.

As further shown in FIG. 6, if a score has been determined for each region of the user interface associated with installing the software (block 660—YES), then process 600 may include identifying a predicted click area based on the scores associated with the regions (block 670). For example, user device 210 may determine that a score has been determined for each region of the user interface, and user device 210 may identify a predicted click area based on the scores associated with the regions.

A predicted click area may include an area, corresponding to one or more regions included in a user interface associated with installing software, that a click area prediction model identifies as area of a user interface that, when selected, causes the a software installation procedure to proceed. In some implementations, user device 210 may identify the predicted click area based on the scores associated with the regions of the user interface. For example, user device 210 may identify a region associated with the highest score determined by user device 210 (e.g., when the region receives a score of 1.0), and user device 210 may identify the predicted click area as the area corresponding to the region. In some implementations, the predicted click area may include an area of the user interface that corresponds to a single region. Alternatively, the predicted click area may include an area of the user interface that corresponds to a group of regions (e.g., a group of adjacent regions).

In some implementations, user device 210 may identify a group of predicted click regions based on the scores. For example, user device 210 may identify a first predicted click area (e.g., an area of the user interface that corresponds to a region with a score of 1.0), may identify a second predicted click area (e.g., an area of the user interface that corresponds to a region with a score of 0.9), etc. In this example, user device 210 may store information associated with the group of predicted click areas such that user device 210 may select the group of predicted click areas based on their respective scores.

Additionally, or alternatively, user device 210 may identify the predicted click area based on one or more heuristic techniques. For example, user device 210 may apply a heuristic technique associated with matching the user interface (e.g., dialog box) to a known user interface, matching a series of user interfaces to a known series of user interfaces, detecting and selecting a particular element (e.g., a check box, a radio button, etc.) included in the user interface, etc.

In some implementations, user device 210 may identify the predicted click area, and user device 210 may select (e.g., by automatically clicking) the predicted click area to attempt to advance the software installation procedure. For example, user device 210 may identify the predicted click area, and may select the predicted click area. In this example, user device 210 may wait for a period of time (e.g., 2 seconds, 5 seconds, etc.) after selecting the predicted click area, and may capture an additional screenshot image. User device 210 may then determine whether the software installation procedure has advanced based on the additional screenshot image. For example, if the additional screenshot image includes the user interface (e.g., when selecting the predicted click area did not result in any change to the user interface), then user device 210 may identify and select another predicted click area (e.g., an area corresponding to a region with the second highest score), and may select the other predicted click area. In this way, user device 210 may select one or more predicted click areas, associated with the user interface, in an attempt to advance the software installation procedure.

In some implementations, user device 210 may select the predicted click area, may wait for a period of time, and may capture an additional screenshot image that includes a different user interface. User device 210 may then return to block 630 and determine regions included in the user interface, and may proceed as described above. In this way, user device 210 may continue to identify and select predicted click areas for a series of user interfaces associated with the software installation procedure (e.g., until the software installation is completed).

In some implementations, user device 210 may store information associated with one or more user interfaces associated with the software installation procedure. For example, user device 210 may select a predicted click area included in a first user interface; may store information that identifies the location of the predicted click area of the first user interface; may select a predicted click area included in a subsequent, second user interface; may store information that identifies the location of the predicted click area of the second user interface; etc. In this example, if user device 210 determines that the software installation procedure has returned to the first user interface, user device 210 may select a different predicted click area (e.g., based on the information stored by user device 210), such that user device 210 does not select the same sequence of predicted click areas in the series of user interfaces. In other words, user device 210 may store information that allows user device 210 to traverse multiple pathways through the software installation procedure.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

FIGS. 7A-7E are diagrams of an example implementation 700 relating to example process 600 shown in FIG. 6. For the purposes of example implementation 700, assume that a user device, UD1, has received an instruction to automatically (e.g., without user intervention), install software (e.g., Media Player). Further, assume that UD1 is capable of communicating with a modeling device, MD1, that stores a click area prediction model that may be used to predict one or more click areas of dialog boxes associated with installing the Media Player software.

Figure 7B:
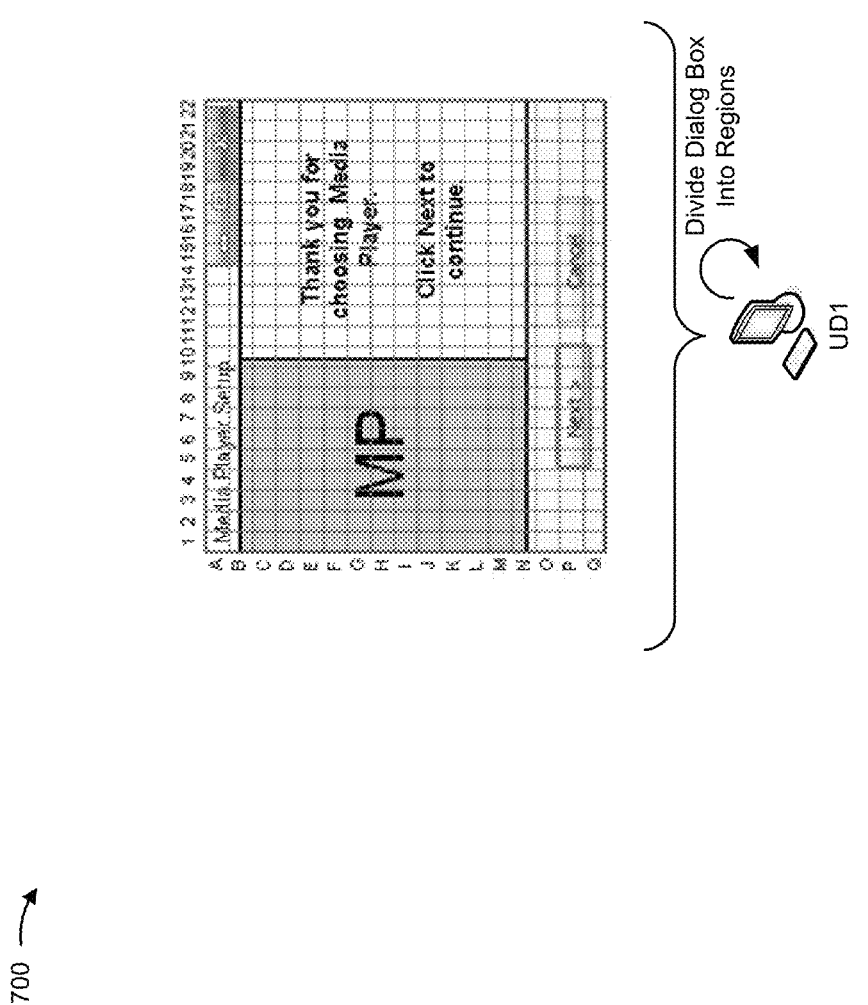

Assume that UD1 receives the instruction to automatically install the Media Player software, and initiates a software installation procedure associated with installing the Media Play software (e.g., by displaying a first dialog box). As shown in FIG. 7A, UD1 may identify the dialog box by capturing a screenshot image and comparing the screenshot image to a base screenshot image (e.g., a screenshot image stored by UD1 that does not include any user interfaces). As shown in FIG. 7B, UD1 may determine regions included in the dialog box by dividing the dialog box into regions using a grid system (e.g., including rows A through Q and columns 1 through 22).

Figure 7C:
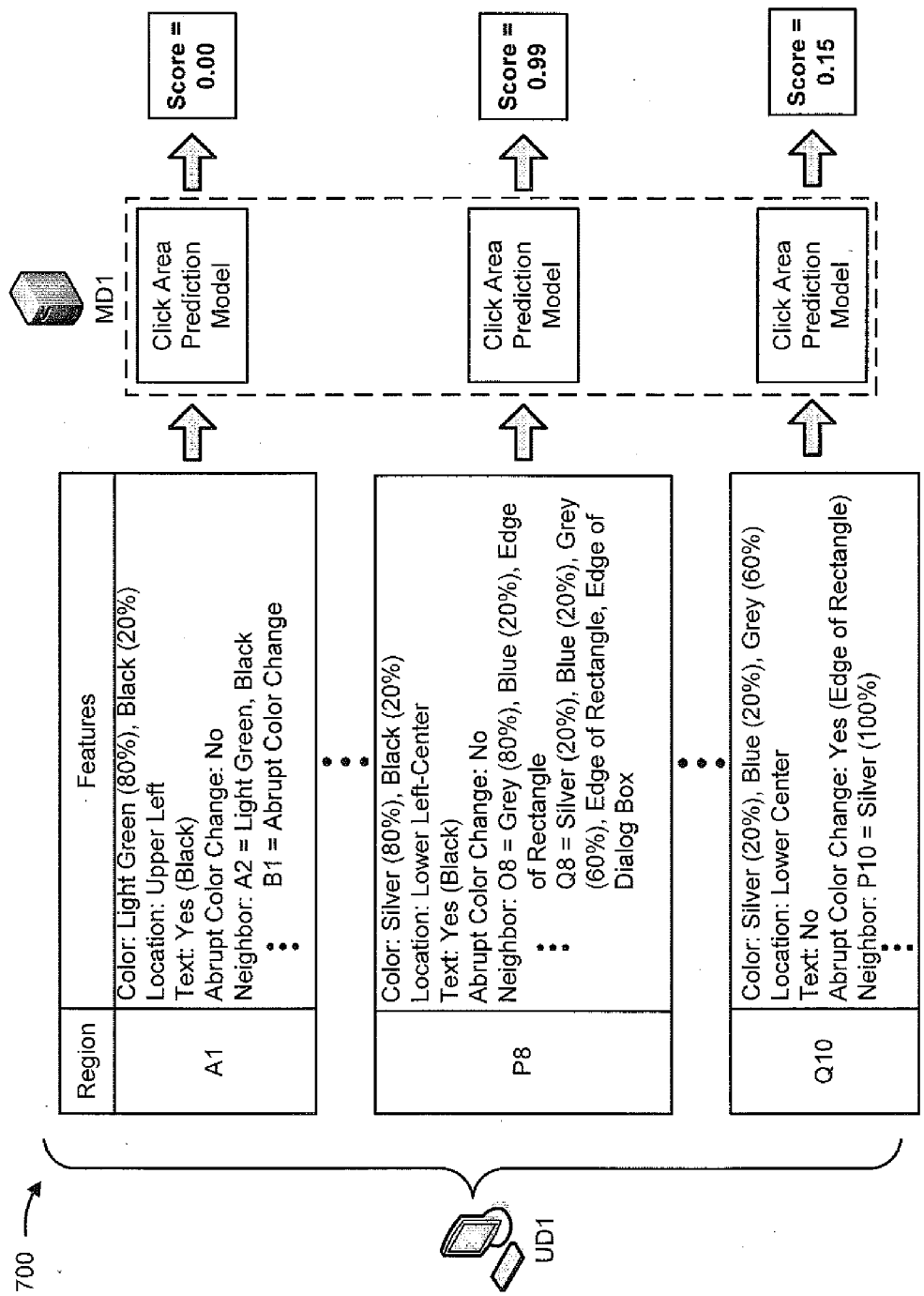

As shown in FIG. 7C, UD1 may then identify a set of features associated with a first region included in the user interface, A1. As shown, the set of features associated with the A1 region may include color features (e.g., Color: Light Green (80%), Black (20%)), geometric features (e.g., Location: Upper Left), text features (e.g., Text: Yes (Black)), fill features (e.g., Abrupt Color Change: No), and neighbor features (e.g., Neighbor: A2=Light Green, Black, B1=Abrupt Color Change), and other features associated with the A1 region (not shown). As further shown, UD1 may determine a score associated with the A1 region by providing information associated with the set of features as input to a click area prediction model (e.g., via MD1). As shown, the click area prediction may receive the information associated with the set of features, and may output a score (e.g., 0.00) for the A1 region.

As further shown, UD1 may continue to determine a set of features and a score for each region of the dialog box, including a set of features associated with region P8. As shown, the set of features associated with the P8 region may include color features (e.g., Color: Silver (80%), Black (20%)), geometric features (e.g., Location: Lower Left-Center), text features (e.g., Text: Yes (Black)), fill features (e.g., Abrupt Color Change: No), and neighbor features (e.g., Neighbor: 08=Grey (80%), Blue (20%), Edge of Rectangle, Q8=Silver (20%), Blue (20%), Grey (60%), Edge of Rectangle, Edge of Dialog Box), and other features associated with the P8 region (not shown). As further shown, UD1 may determine a score associated with the P8 region by providing information associated with the set of features as input to the click area prediction model. As shown, the click area prediction may receive the information associated with the set of features, and may output a score (e.g., 0.99) for the P8 region.

As further shown, UD1 may continue to determine a set of features and a score for each region of the dialog box, including a set of features associated with region Q10. As shown, the set of features associated with the Q10 region may include color features (e.g., Color: Silver (20%), Blue (20%), Grey (60%)), geometric features (e.g., Location: Lower Center), text features (e.g., Text: No), fill features (e.g., Abrupt Color Change: Yes (Edge of Rectangle), and neighbor features (e.g., Neighbor: P10=Silver (100%)), and other features associated with the Q10 region (not shown). As further shown, UD1 may determine a score associated with the Q10 region by providing information associated with the set of features as input to the click area prediction model. As shown, the click area prediction may receive the information associated with the set of features, and may output a score (e.g., 0.15) for the Q10 region.

As shown in FIG. 7D, after UD1 has determined a score for each region included in the dialog box, UD1 may identify a predicted click area associated with the dialog box. For the purposes of example implementation 700, assume that UD1 is configured to identify the region with the highest score as a predicted click area. As shown, assume that the P8 region has the highest score (e.g., 0.99) as determined by the click area prediction model. As shown, UD1 may then select (e.g., by automatically clicking) the predicted click area.

Figure 7E:
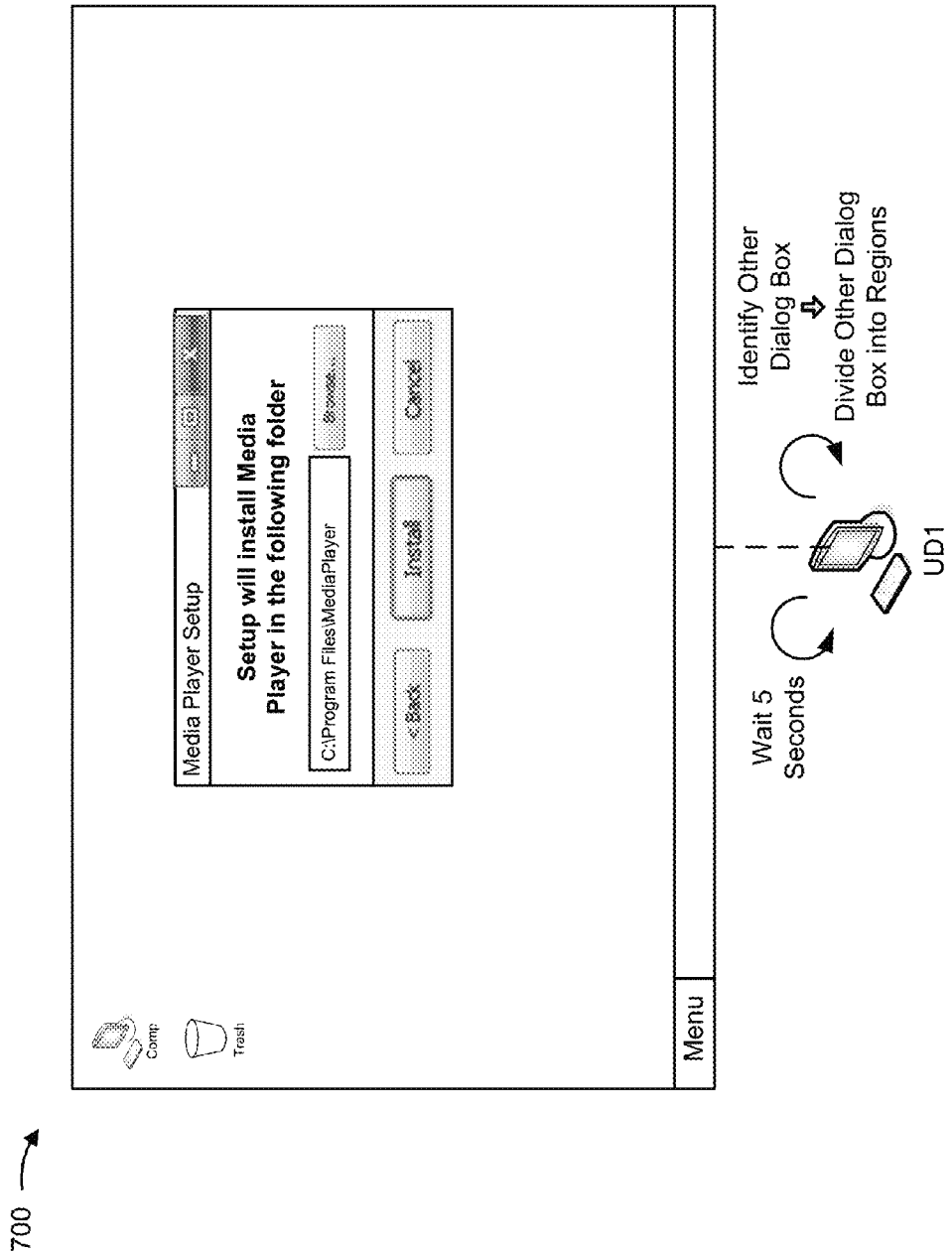

As shown in FIG. 7E, another dialog box may be displayed based on UD1 selecting the first predicted click area included in the dialog box. As shown, UD1 may wait five seconds after selecting the predicted click area, may capture a screenshot image including the other dialog box, may determine that the other dialog box is different than the dialog box (e.g., that the software installation procedure has advanced), and may repeat one or more of the operations described above to proceed with installing the software.

As indicated above, FIGS. 7A-7E are provided merely as an example. Other examples are possible and may differ from what was described with regard to FIGS. 7A-7E.

Implementations described herein may allow a device to automatically (e.g., without user intervention) install software by training a click area prediction model to detect and intelligently select click areas of user interfaces associated with installing the software. In this way, software may be automatically installed, despite the use of non-standard user interfaces in the software installation procedure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive an instruction to automatically install a program using a click area prediction model,
         the click area prediction model being associated with predicting a click area of a user interface,
            the click area including an area of the user interface that, when selected, causes a program installation procedure, associated with installing the program, to proceed;
      identify a first installation user interface associated with installing the program;
      determine a group of regions included in the first installation user interface;
      identify sets of features associated with the group of regions,
         each set of features, of the sets of features, corresponding to a region of the group of regions;
      determine, based on the sets of features and the click area prediction model, a group of scores associated with the group of regions,
         each score, of the group of scores, corresponding to a region of the group of regions;
      identify a particular region, of the group of regions, as a predicted click area based on the group of scores; and
      select the predicted click area,
         the predicted click area being selected to attempt to cause the program installation procedure to proceed;
      determine whether the program installation procedure has proceeded to a subsequent installation user interface, associated with installing the program, or has returned to a particular installation user interface associated with installing the program;
      select a subsequent predicted click area, associated with a particular region of the subsequent installation user interface, based on determining that the program installation procedure has proceeded to the subsequent installation user interface; and
      select a different predicted click area, associated with a different particular region of the particular installation user interface, based on determining that the program installation procedure has returned to the particular installation user interface.

2. The device of claim 1, where the one or more processors are further to:
   receive a training user interface, including a known click area, for training the click area prediction model for use in connection with installing a program;
   determine a group of training regions included in the training user interface;
   identify sets of training features associated with the group of training regions,
      each set of training features, of the sets of training features, corresponding to a training region of the group of training regions;
   determine, based on the known click area, a group of training scores associated with the group of training regions,
      each training score, of the group of training scores, corresponding to a training region of the group of training regions; and
   update the click area prediction model based on the sets of training features and the groups of training scores.

3. The device of claim 1, where the set of features associated with each region includes at least one of:
   a color feature associated with one or more colors included in the region;
   a geometric feature associated with a position of the region;
   an image fragment feature associated with whether the region matches another region associated with a known click area;
   a fill feature associated with a distance between lines or transitions included in the region;
   a text feature associated with text included in the region; or
   a neighbor feature associated with one or more features of one or more regions adjacent to the region.

4. The device of claim 1, where the one or more processors, when determining the group of regions included in the first installation user interface, are to:
   determine the group of regions, included in the first installation user interface, using a grid to divide the first installation user interface into the group of regions,
      each region, of the group of regions, corresponding to a section of the grid.

5. The device of claim 1, where the one or more processors are further to:
   identify a maximum score of the group of scores; and
   identify a region associated with the maximum score; and
   where the one or more processors, when identifying the particular region, are to:
      identify the particular region based on the region associated with the maximum score.

6. The device of claim 1, where the predicted click area is a first predicted click area,
   the first predicted click area including an area of the first installation user interface that includes a first region of the group of regions; and
   where the one or more processors are further to:
      determine that selecting the first predicted click area did not cause the program installation procedure to proceed;

identify a second predicted click area, of the first installation user interface, based on the group of scores,
the second predicted click area including a second region, of the group of regions, and being different than the first predicted click area; and
select the second predicted click area of the installation user interface to attempt to cause the program installation procedure to proceed.

7. The device of claim 1, where the group of regions is a first group of regions, the sets of features are first sets of features, the group of scores is a first group of scores, and the predicted click area is a first predicted click area,
the first predicted click area being selected and causing the program installation procedure to proceed to a second installation user interface; and
where the one or more processors are further to:
identify the second installation user interface associated with installing the program,
the second installation user interface being different than the first installation user interface;
determine a second group of regions included in the second installation user interface;
identify second sets of features associated with the second group of regions;
determine, based on the second sets of features and the click area prediction model, a second group of scores associated with the second group of regions;
identify a second predicted click area, included in the second installation user interface, based on the second group of scores; and
select the second predicted click area,
the second predicted click area being selected to attempt to cause the program installation procedure to proceed.

8. A non-transitory computer-readable medium storing instructions, the instructions comprising:
one or more instructions that, when executed by one or more processors, cause the one or more processors to:
receive an indication to install a program, without user intervention, using a click area prediction model associated with predicting a click area of a user interface,
the click area including an area of the user interface that, when selected, causes a program installation process, associated with installing the program, to continue;
determine a first installation user interface associated with installing the program;
identify a group of regions included in the first installation user interface;
determine sets of features associated with the group of regions,
each set of features, of the sets of features, being associated with a corresponding region of the group of regions;
determine, based on the sets of features and the click area prediction model, a group of scores associated with the group of regions,
each score, of the group of scores, being associated with a corresponding region of the group of regions, and
each score, of the group of scores, reflecting a prediction that the corresponding region is associated with a click area of the first installation user interface;
identify a particular region, of the group of regions, as a predicted click area based on the group of scores;
select the predicted click area,
the predicted click area being selected to attempt to cause the program installation process to continue;
determine whether the program installation process has proceeded to a subsequent installation user interface, associated with installing the program, or has proceeded to a previous installation user interface associated with installing the program;
select a subsequent predicted click area, associated with a particular region of the subsequent installation user interface, based on determining that the program installation process has proceeded to the subsequent installation user interface; and
select a different predicted click area, associated with a different particular region of the previous installation user interface, based on determining that the program installation process has proceeded to the previous installation user interface.

9. The non-transitory computer-readable medium of claim 8, where the one or more instructions, when executed by the one or more processors, further cause the one or more processors to:
receive a training user interface, including a known click area, for training the click area prediction model for use in connection with installing a program;
determine a group of training regions included in the training user interface;
identify sets of training features associated with the group of training regions,
each set of training features, of the sets of training features, corresponding to a training region of the group of training regions;
determine, based on the known click area, a group of training scores associated with the group of training regions,
each training score, of the group of training scores, corresponding to a training region of the group of training regions; and
update the click area prediction model based on the sets of training features and the groups of training scores; and
where the one or more instructions, when determining the group of scores associated with the group of regions, cause the one or more processors to:
determine the group of scores associated with the group of regions based on the updated click area prediction model.

10. The non-transitory computer-readable medium of claim 8, where the one or more instructions, when executed by the one or more processors, further cause the one or more processors to:
capture a screenshot image that includes the first installation user interface; and
compare the screenshot image to a stored base screenshot image
the stored base screenshot image not including the first installation user interface; and
where the one or more instructions, when determining the first installation user interface associated with installing the program, cause the one or more processors to:
determine the first installation user interface based on comparing the screenshot image to the stored base screenshot image.

11. The non-transitory computer-readable medium of claim 8, where the one or more instructions, when identifying the group of regions included in the first installation user interface, cause the one or more processors to:

identify the group of regions included in the first installation user interface based on elements included in the first installation user interface,
the elements included in the first installation user interface including the click area.

12. The non-transitory computer-readable medium of claim 8, where the one or more instructions, when executed by the one or more processors, further cause the one or more processors to:
identify a maximum score of the group of scores; and
identify a region associated with the maximum score; and
where the one or more instructions, when identifying the particular region, cause the one or more processors to:
identify the particular region based on the region associated with the maximum score.

13. The non-transitory computer-readable medium of claim 8, where the predicted click area is a first predicted click area,
the first predicted click area including an area of the first installation user interface that includes a first region of the group of regions; and
where the one or more instructions, when executed by the one or more processors, further cause the one or more processors to:
determine that selecting the first predicted click area did not cause the program installation process to continue;
identify a second predicted click area, of the first installation user interface, based on the group of scores,
the second predicted click area including a second region of the group of regions and being different than the first predicted click area; and
select the second predicted click area to attempt to cause the program installation process to continue.

14. The non-transitory computer-readable medium of claim 8, where the group of regions is a first group of regions, the sets of features are first sets of features, the group of scores is a first group of scores, and the predicted click area is a first predicted click area,
the first predicted click area being selected and causing the program installation process to continue; and
where the one or more instructions, when executed by the one or more processors, further cause the one or more processors to:
determine a second installation user interface associated with installing the program,
the second installation user interface being different than the first installation user interface;
identify a second group of regions included in the second installation user interface;
determine second sets of features associated with the second group of regions;
determine, based on the second sets of features and the click area prediction model, a second group of scores associated with the second group of regions;
identify a second predicted click area, included in the second installation user interface, based on the second group of scores; and
select the second predicted click area based on identifying the second predicted click area,
the second predicted click area being selected to attempt to cause the program installation process to continue.

15. A method, comprising:
receiving, by a device, an indication to automatically install software using a click area prediction model,
the click area prediction model being associated with predicting a click area of a user interface,
the click area including an area of the user interface that, when selected, causes a software installation procedure, associated with installing the software, to advance;
identifying, by the device, a first installation user interface associated with installing the software;
determining, by the device, a group of regions include in the first installation user interface;
identifying, by the device, sets of features associated with the group of regions,
each set of features of the sets of features corresponding to a region of the group of regions;
determining, by the device, a group of scores associated with the group of regions,
the group of scores being determined based on inputting the sets of features into the click area prediction model, and
each score of the group of scores corresponding to a region of the group of regions;
identifying, by the device, a predicted click area based on the group of scores; and
selecting, by the device, the predicted click area based on identifying the predicted click area,
the predicted click area being selected to attempt to cause the software installation procedure to advance;
determining, by the device, whether the software installation procedure has proceeded to a subsequent installation user interface, associated with installing the software, or has returned to a previous installation user interface associated with installing the software;
selecting, by the device, a subsequent predicted click area, associated with a particular region of the subsequent installation user interface, based on determining that the software installation procedure has proceeded to the subsequent installation user interface; and
selecting, by the device, a different predicted click area, associated with a different region of the previous installation user interface, based on determining that the software installation procedure has returned to the previous installation user interface.

16. The method of claim 15, further comprising:
receiving a training user interface, including a known click area, for training the click area prediction model for use in connection with installing software;
determining a group of training regions included in the training user interface;
identifying sets of training features associated with the group of training regions,
each set of training features of the sets of training features corresponding to a training region of the group of training regions;
determining, based on the known click area, a group of training scores associated with the group of training regions,
each training score of the group of training scores corresponding to a training region of the group of training regions;
updating the click area prediction model based on the sets of training features and the groups of training scores.

17. The method of claim 15, where the set of features associated with each region includes at least one of:
a color feature associated with one or more colors included in the region;
a geometric feature associated with a position of the region;

an image fragment feature associated with whether the region matches another region associated with a known click area;

a fill feature associated with a distance between lines or transitions included in the region;

a text feature associated with text included in the region; or a neighbor feature associated with one or more features of one or more regions adjacent to the region.

18. The method of claim 15, further comprising:
identifying a high score of the group of scores;
identifying a region associated with the high score; and
where identifying the predicted click area further comprises:
identifying the predicted click area based on the region associated with the high score.

19. The method of claim 15, where the predicted click area is a first predicted click area,
the first predicted click area including an area of the first installation user interface that includes a first region of the group of regions; and
where the method further comprises:
determining that selecting the first predicted click area did not cause the software installation procedure to advance;
identifying a second predicted click area, of the first installation user interface, based on the group of scores,
the second predicted click area being different than the first predicted click area; and
selecting the second predicted click area to attempt to cause the software installation procedure to advance.

20. The method of claim 15, where the group of regions is a first group of regions, the sets of features are first sets of features, the group of scores is a first group of scores, and the predicted click area is a first predicted click area,
the first predicted click area being selected and causing the software installation procedure to advance; and
where the method further comprises:
identifying a second installation user interface associated with installing the software,
the second installation user interface being different than the first installation user interface;
determining a second group of regions included in the second installation user interface;
identifying second sets of features associated with the second group of regions;
determining, based on the second sets of features and the click area prediction model, a second group of scores associated with the second group of regions;
identifying a second predicted click area, included in the second installation user interface, based on the second group of scores; and
selecting the second predicted click area based on identifying the second predicted click area,
the second predicted click area being selected to attempt to cause the software installation procedure to advance.

\* \* \* \* \*

UNITED STATES PATENT AND TRADEMARK OFFICE
CERTIFICATE OF CORRECTION

PATENT NO. : 9,477,457 B1
APPLICATION NO. : 14/230122
DATED : October 25, 2016
INVENTOR(S) : Jacob Asher Langton et al.

It is certified that error appears in the above-identified patent and that said Letters Patent is hereby corrected as shown below:

Please correct Claim 6 as follows:

Column 19, line 7, change "click area of the installation user interface to attempt" to --click area to attempt--

Signed and Sealed this
Twenty-seventh Day of December, 2016

Michelle K. Lee
*Director of the United States Patent and Trademark Office*